United States Patent
Kumar et al.

(10) Patent No.: US 11,740,951 B2
(45) Date of Patent: Aug. 29, 2023

(54) ENSURING KEY EVENT DELIVERY TO A HOST FROM A CLIENT DURING A HIGH EVENT RATE

(71) Applicant: Dell Products L.P., Round Rock, TX (US)

(72) Inventors: Jitendra Kumar, Bangalore (IN); Rajeshkumar Patel, Bangalore (IN); Soorej Ponnandi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 17/464,392

(22) Filed: Sep. 1, 2021

(65) Prior Publication Data

US 2023/0064833 A1    Mar. 2, 2023

(51) Int. Cl.
*G06F 9/54* (2006.01)
*G06F 3/038* (2013.01)

(52) U.S. Cl.
CPC .............. *G06F 9/544* (2013.01); *G06F 3/038* (2013.01)

(58) Field of Classification Search
None
See application file for complete search history.

(56) References Cited

U.S. PATENT DOCUMENTS

| | | |
|---|---|---|
| 10,402,364 B1 | 9/2019 | Vajravel et al. |
| 2013/0290787 A1* | 10/2013 | Chen ................... H04L 43/0817 714/37 |
| 2015/0371032 A1 | 12/2015 | Puli et al. |
| 2019/0026202 A1* | 1/2019 | Chalfant ............... G06F 11/006 |
| 2020/0326998 A1 | 10/2020 | Chandrasekhar et al. |
| 2020/0356389 A1 | 11/2020 | Chandrasekhar et al. |

* cited by examiner

*Primary Examiner* — Umut Onat
(74) *Attorney, Agent, or Firm* — Larson Newman, LLP

(57) ABSTRACT

A baseboard management controller in an information handling system receives a human interface device input and converts the human interface device input into a human interface device scan code for storage at a human interface device descriptor buffer. The baseboard management controller determines whether or not the human interface device descriptor buffer is full and copying, when the human interface device descriptor buffer is full, the human interface scan codes in the human interface device descriptor buffer to a memory segment and sending an error code to a host system. The baseboard management controller also clears the human interface device descriptor buffer and re-populates the human interface device descriptor buffer with the human interface device scan code and the human interface device scan codes from the memory segment.

20 Claims, 6 Drawing Sheets

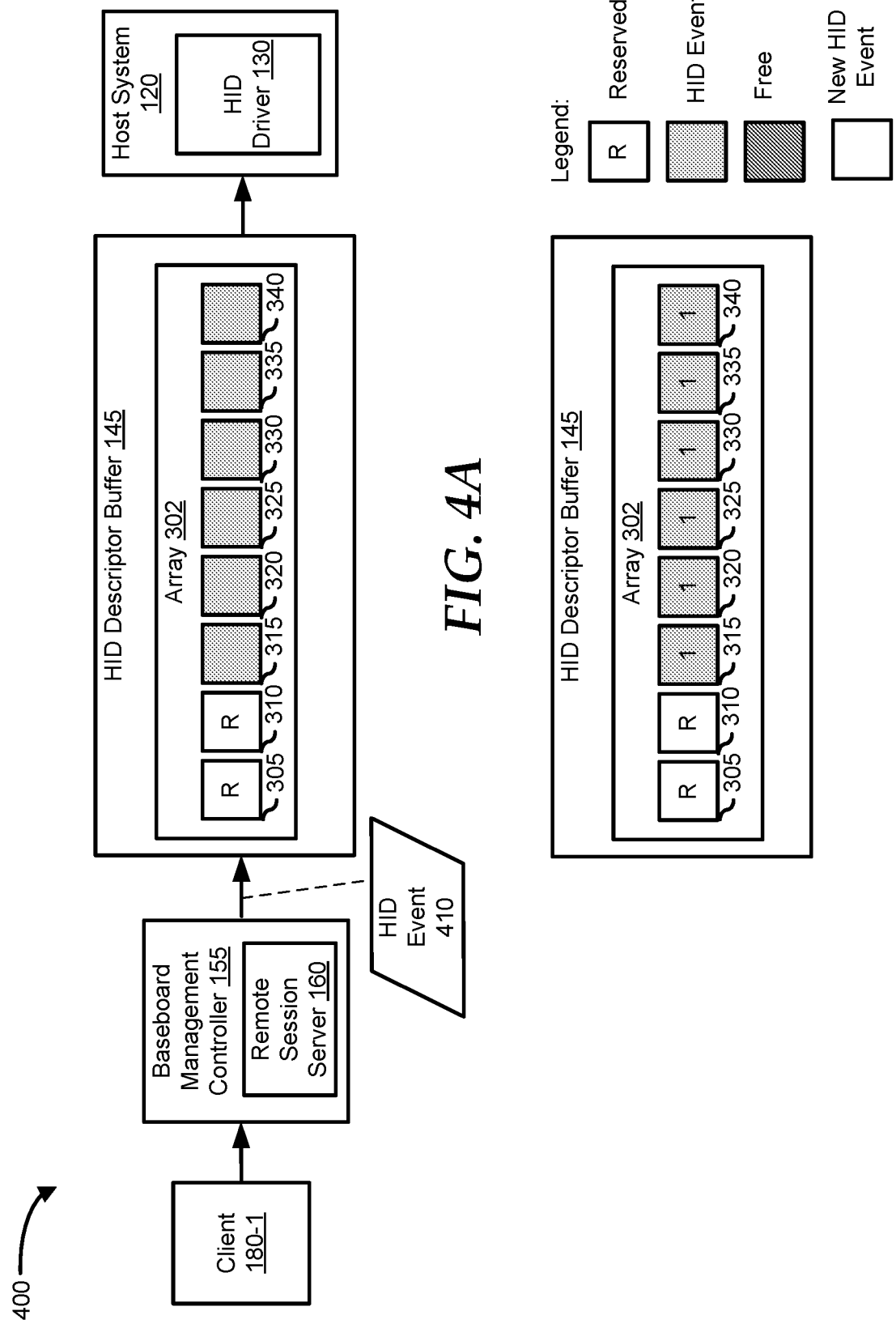

ENSURING KEY EVENT DELIVERY TO A HOST FROM A CLIENT DURING A HIGH EVENT RATE

FIELD OF THE DISCLOSURE

The present disclosure generally relates to information handling systems, and more particularly relates to ensuring key event delivery to a host from a client during a high event rate.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A baseboard management controller in an information handling system receives a human interface device input and converts the human interface device input into a human interface device scan code for storage at a human interface device descriptor buffer. The baseboard management controller determines whether or not the human interface device descriptor buffer is full and copying, when the human interface device descriptor buffer is full, the human interface scan codes in the human interface device descriptor buffer to a memory segment and sending an error code to a host system. The baseboard management controller also clears the human interface device descriptor buffer and re-populates the human interface device descriptor buffer with the human interface device scan code and the human interface device scan codes from the memory segment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 4A, 4B, 4C, and 4D are block diagrams illustrating a system for ensuring key event delivery to a host from a client during a high event rate, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Figure 1:
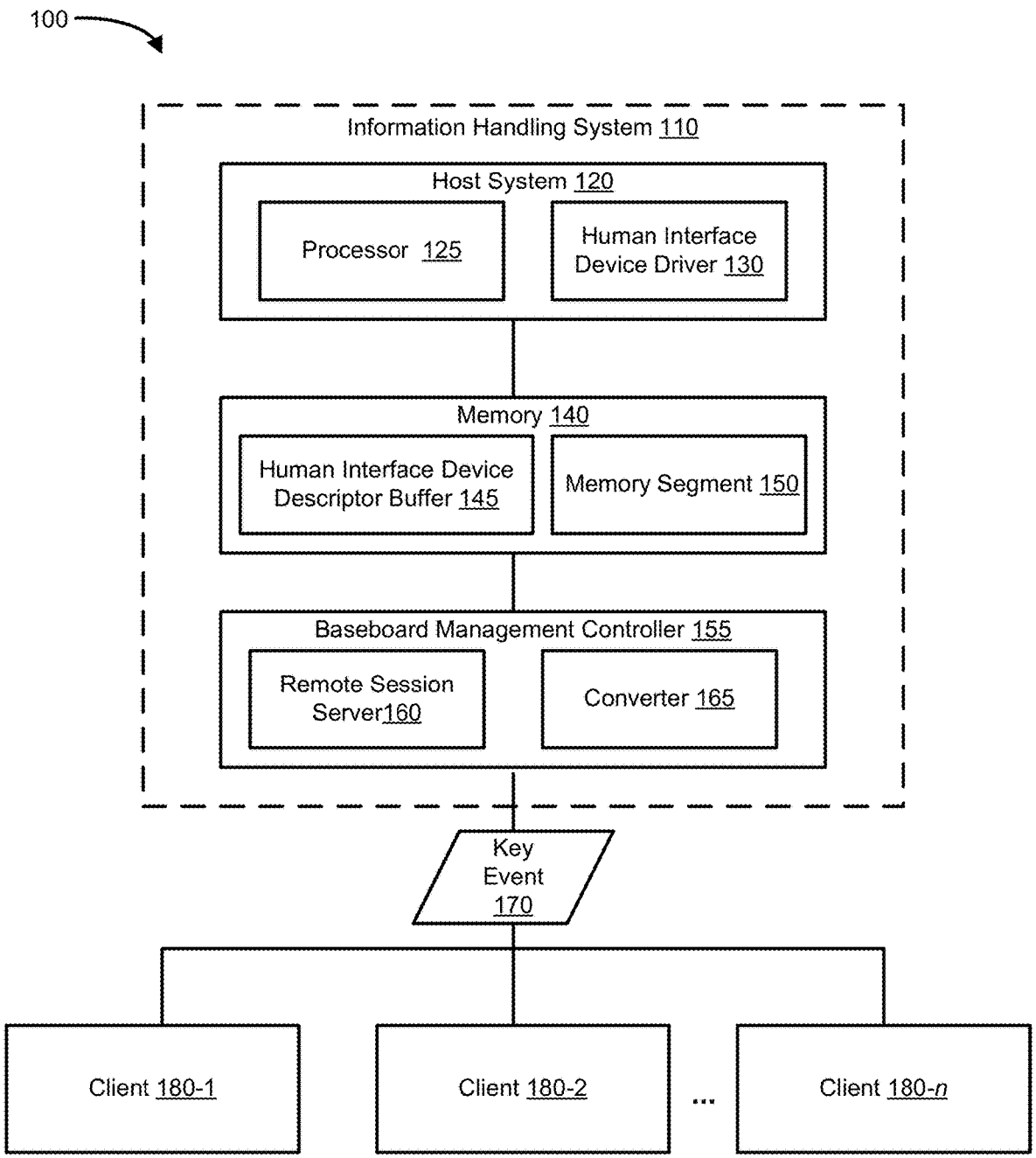
FIG. 1 is a block diagram illustrating an example of a system for ensuring key event delivery to a host from a client during a high event rate, according to an embodiment of the present disclosure.

FIG. 1 shows a system 100 for ensuring key event delivery to a host from a client during a high event rate. That is, system 100 prevents loss of key events, also referred to as human interface device (HID) events, in a HID descriptor buffer. System 100 includes an information handling system 110, which is similar to information handling system 500 of FIG. 5, and clients 180-1-180-n (referred herein as client(s) 180). Information handling system 110 includes a host system 120, a memory 140, and a baseboard management controller 155. Host system 120, also referred to as a host, includes a processor 125 and an HID driver 130. Memory 140 includes an HID descriptor buffer 145 and a memory segment 150. Baseboard management controller 155 includes a remote session server 160 and a converter 165. Each of these components can be implemented with hardware, firmware, and/or software or any combination thereof. In addition, connections between components may be omitted for descriptive clarity.

Administration of an information handling system is often performed remotely over a communications network. For example, an information handling system can include a management controller, such as baseboard management controller 155, which is similar to baseboard management controller (BMC) 590 of FIG. 5 and also referred herein as a service processor, a side-band processor, an out-of-band processor, and the like, through which a user can gain access to a host system to perform maintenance and other administrative tasks. Baseboard management controller 155 can include a central processing unit, volatile and non-volatile memory devices, and a network interface controller (NIC) that can establish remote communication with the information handling system using various remote desktop systems such as a virtual network computing (VNC) system. The remote desktop system may use one of the various protocols such as remote frame buffer (RFB) protocol, remote desktop protocol (RDP), Splashtop™, etc. For example, the VNC system uses the RFB protocol to remotely control another computer.

In an embodiment, baseboard management controller 155 may be configured to execute program instructions to implement a remote session server 160 which may be used to provide remote management access to host system 120. Host system 120 can be accessed by multiple interfaces, such as via a virtual console like one of clients 180 via processor 125. For example, baseboard management controller 155 may be configured to establish a virtual console session between host system 120 and one of clients 180. Each one of clients 180 may represent any computing device that is capable of implementing a remote display protocol, such as a virtual console to access a remote session server 160 to manager or use host system 120. As examples, clients 180 could be computing devices that run on Windows®, Linux™, iOS™ Android®, or another operating system and that includes a remote desktop client such as Windows Remote Desktop Connection application, the VMWare® Horizon client, the Citrix® Workspace application, a VNC client, etc. A user may utilize one or more HIDs such as a keyboard, video, and mouse (KVM) on one of clients 180 to control corresponding HIDs on host system 120 via HID driver 130 and/or processor 125.

Remote session server 160 may represent any number of computing devices or computing components that can function as a server to host remote sessions that users of clients 180, which may be a VNC client, may access via a remote display protocol. Remote session server 160 could be a physical or virtual machine that executes a version of the Windows server operating system that includes remote desktop services or a physical or virtual machine that executes a version of the Linux operating system that includes a remote server, such as a VNC server. Remote session server 160 may also be a RFB processor. A remote desktop environment should be construed as encompassing any client-server environment in which a remote display protocol such as RDP, Citrix's HDX™, PC-over-IP (PCoIP), (RFB) protocol, etc. is employed to enable the client to access a desktop or application that executes on the server.

Remote session server 160 can provide a graphical interface to clients 180 that includes an HID such as a virtual keyboard. The virtual keyboard can include a set of keys, each key associated with a unique alphanumeric or special character designation. As the user enters data using the virtual keyboard, remote session server 160 receives key press information such as a sequence of coordinates identifying which keys are being selected by the user. For example, the keypress information, such as a key event 170, may be to be transmitted to the remote session server. Key event 170 may include status change information from the HID such as a keypress, a mouse movement, etc. Converter 165 extracts the commands, requests and other information from key event 170 into data for communication to host system 120. In one example, converter 165 decodes the sequence of coordinates to determine the individual characters or keys selected by the user. In particular converter 165 may convert RFB codes to a scan code, which is data used to report which keys is pressed in a keyboard, button clicked on a mouse or game controller, etc.

Baseboard management controller 155 may be configured to support six simultaneous virtual console sessions. Key information such as from key event 170 may be stored in segments of memory like HID descriptor buffer 145 which includes a human interface device descriptor which is an array of human interface device scan codes. HID descriptor buffer 145 can generally support a predetermined number of key events. For example, HID descriptor buffer 145 can support up to six key events, that is store up to six bytes of descriptor reports, or scan codes. Having six virtual consoles simultaneously active with key events from several different sources from each virtual console (e.g. a physical keyboard, virtual keyboard, and virtual clipboard) the rate at which key events are sent to the management controller may occasionally be at a high, also referred to as a high event rate.

Because the number of key events may be higher than what can be processed, the HID descriptor buffer may overflow. When the HID descriptor overflows, no new key events can be added to the HID descriptor buffer until a previous key event has been released. This may result in sluggish access to one or more virtual consoles or cause a key event to be lost, dropped, or left unprocessed. Although key events herein are associated with a physical keyboard, virtual keyboard, or virtual clipboard, key events may include information from other physical or virtual HIDs such as a mouse, a game controller, a joystick, etc. To address these and other concerns, when HID descriptor buffer 145 is full, an error code in all of the array fields is reported. The error code is typically a report code, such as an errorRollOver event, when the key events exceed a pre-determined report count, which is typically limited to six key events. Although the report count is limited to six key events in this example, the report count may be greater than or less than the six key events.

In a particular embodiment, before the error code is sent, the key events currently in HID descriptor buffer 145 are stored temporarily in memory segment 150. After the error code is sent, HID descriptor buffer 145 is cleared then the HID descriptor buffer 145 is re-populated with a new key event followed by the key events stored in memory segment 150. Even if none of the key events are released at this time, the key event stricken out from the descriptor buffer will be added back in the next iteration. The key events stored in memory segment 150 may be added to HID descriptor buffer 145 one at a time as space becomes available. If the new key events fill up all the array fields of HID descriptor buffer 145, another error code may be reported. Also, before reporting the other error code, the key events currently in HID descriptor buffer may be stored temporarily in memory segment 150. This process iterates until the key events can be processed without generating the error code. As such, the present disclosure avoids key event misses and ensures all keys are processed and delivered to the host system during a high event rate.

Those of ordinary skill in the art will appreciate that the configuration, hardware, and/or software components of system 100 depicted in FIG. 1 may vary. For example, the illustrative components within system 100 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
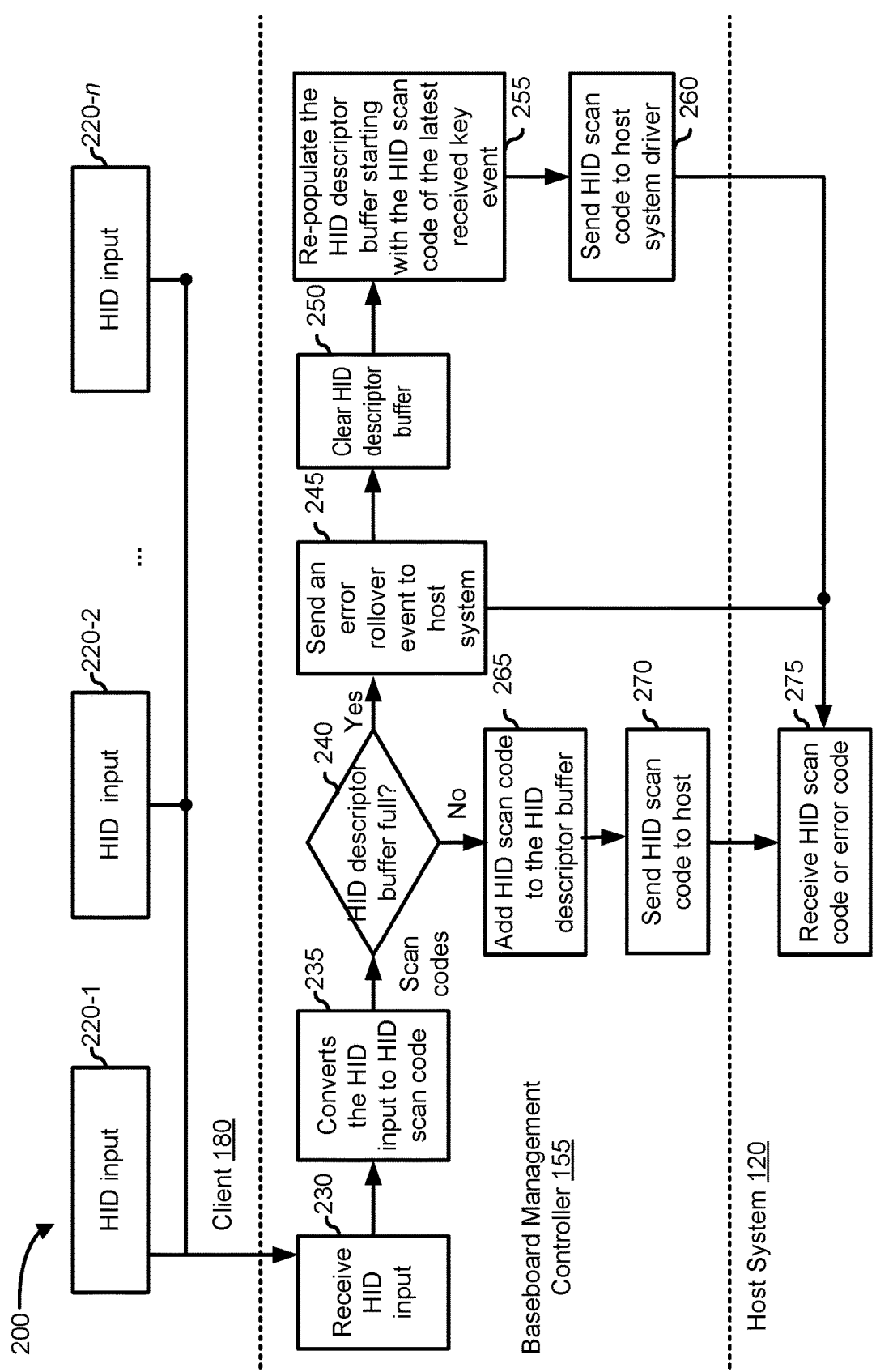
FIG. 2 is a flowchart illustrating an example of a sequence diagram for ensuring key event delivery to a host from a client during a high event rate, according to an embodiment of the present disclosure.

FIG. 2 shows a sequence diagram 200 for ensuring key event delivery to a host from a virtual client during a high event rate. That is, sequence diagram 200 prevents loss of key events when a human interface device (HID) buffer is full. The key events are based one or more HID inputs such as keyboard inputs from a KVM-1 through KVM-n at blocks 220-1 through 220-n of client 180. A client may have one or more HIDs associated with its virtual console. In one embodiment, the HID inputs may be transmitted to baseboard management controller 155 using a remote access protocol, such as the RFB protocol. The HID input may be transmitted as key events that include information associated with the HID input such as a key, button, or similar that is pressed or accessed by the user. In one embodiment, the key events may be RFB codes.

At block 230, the HID input and/or key event may be received by a remote session server, also referred herein as a server. The server may be a VNC server, an RFB event processor, or something similar. At block 235, the HID input or the key event is converted to an HID scan code. During the conversion, a converter associated with the server determines whether the received key events are non-printable input, printable input, control characters (e.g., alt, caps), an LED operation, etc. For example, the converter can determine the keyboard key or the mouse button that was pressed or released by the user at client 180. The converter may map the key event's RFB code to a corresponding HID scan code which will be used to populate an HID descriptor and passed to an HID driver of host system. The scan code may be passed via an HID driver of the management controller.

At decision block 240, it is determined whether the HID descriptor buffer is full. If the HID descriptor buffer is full, then the "YES" branch is taken and proceeds to block 245. If the HID descriptor buffer is not full, then the "NO" branch is taken and proceeds to block 265. At block 245, the method sends an error code to a host system which indicates to the host system that the HID descriptor buffer is full. Before sending the error code, the HID scan codes in the HID descriptor buffer may be stored in a volatile memory segment. At block 250, the HID descriptor buffer is cleared. At block 255, the HID descriptor buffer is re-populated starting with the latest received key event that may have been received before or after sending the error code to the host system but has not been stored in HID descriptor buffer. At block 260, the HID scan code is transmitted to an HID driver of host system 120. The HID driver may be a Universal Serial Bus (USB) driver that can process multiple HID scan codes. In another embodiment, the HID driver may be a device specific driver such as a keyboard driver, a mouse driver, a game controller driver, etc.

At block 265, the HID scan code is stored in the HID descriptor buffer. At block 270, a particular HID scan code may be transmitted to the HID driver of host system 120 when its corresponding release key event is received. At block 275, the HID driver receives the HID scan code or the error code. One of skill in the art will appreciate that this sequence diagram explains a typical example, which can be extended to advanced applications or services in practice. While embodiments of the present disclosure are described in terms of system 100 of FIG. 1, it should be recognized that other systems may be utilized to perform the described method Although FIG. 2 shows example blocks of sequence diagram 200 some implementation, sequence diagram 200 may include additional blocks, fewer blocks, different blocks, or differently arranged blocks than those depicted in FIG. 2. Those skilled in the art will understand that the principles presented herein may be implemented in any suitably arranged processing system. Additionally, or alternatively, two or more of the blocks of sequence diagram 200 may be performed in parallel. For example, block 265 and block 270 of sequence diagram 200 may be performed in parallel.

Figure 3:
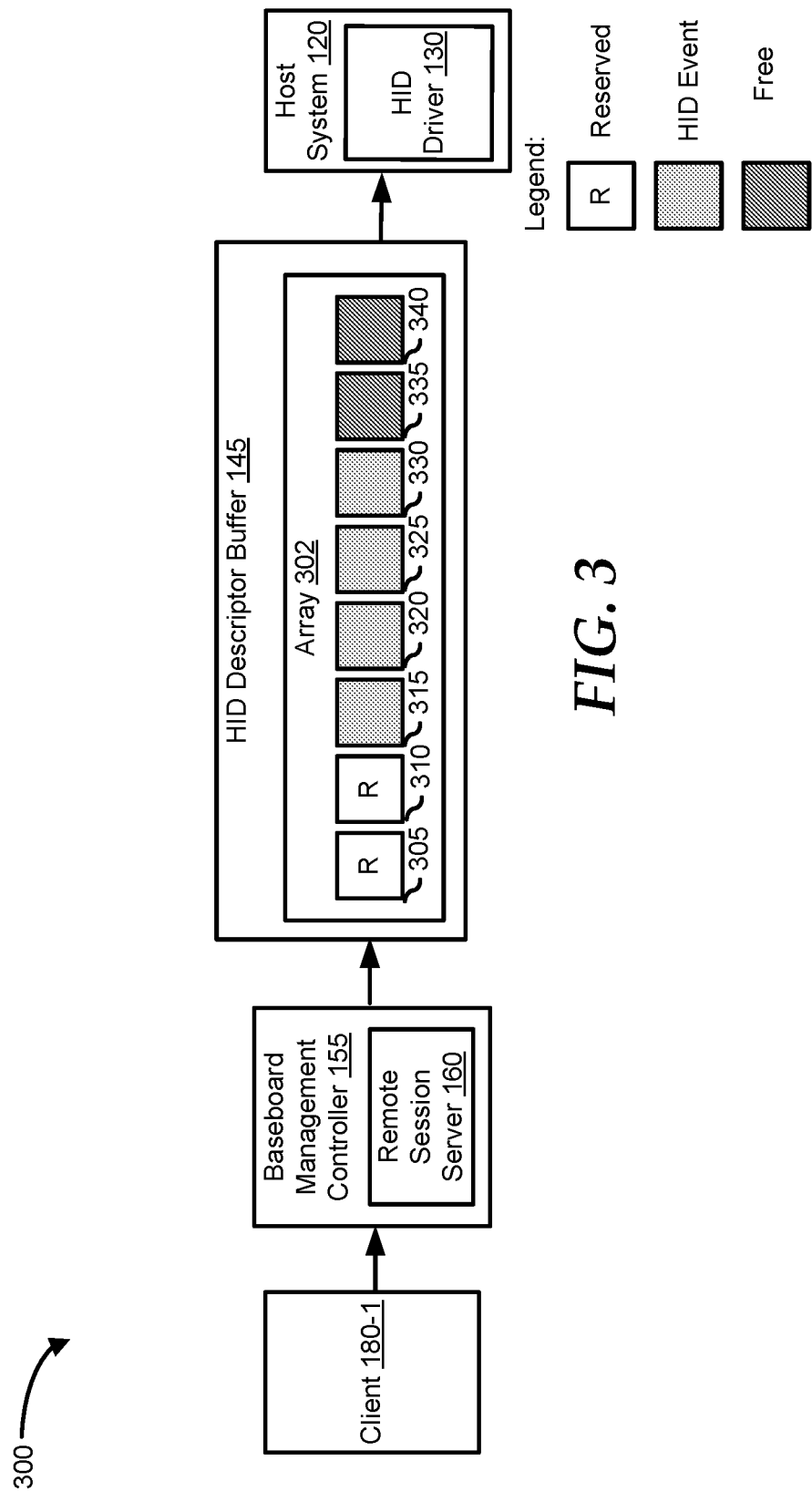
FIG. 3 is a block diagram illustrating an example of a system for ensuring key event delivery to a host from a client during a high event rate, according to an embodiment of the present disclosure.

FIG. 3 shows a system 300, which is similar to system 100 of FIG. 1, for ensuring key event delivery to a host system from a virtual client during a high event rate. That is, system 300 may be configured to prevent loss of key events when the HID descriptor buffer is full. System 300 includes client 180a, baseboard management controller 155, HID descriptor buffer 145, and host system 120. HID descriptor buffer 145 includes an array 302. The components shown are not drawn to scale and system 300 may include additional or fewer components. In addition, connections between components may be omitted for descriptive clarity.

A stream of key events is typically transmitted from one or more clients to baseboard management controller 155. The stream of key events is processed by the remote session server 160 of the management controller. The transmission may use one of the various protocols such as the RFB, RDP, Splashtop, etc. Client 180-1 and remote session server 160 may be one of the various remote desktop systems such as a VNC system, wherein the client may include a virtual console to manage a host.

Here, HID descriptor buffer 145 includes an HID descriptor, such as array 302 which is an eight-byte array, although array 302 may be of a different size. Array 302 includes a series of data fields such as fields 305, 310, 315, 320, 325, 330, 335, and 340. With array 302, the first two bytes are reserved such as for control keys and padding. The remaining bytes, as the remaining six-bytes in this example may be used to store the HID scan codes for host system 120. Here, the control keys and padding are stored in fields 305 and 310 while each one of fields 315, 320, 325, 330, 335, and 340 is used to store an HID scan code that corresponds to an activated key or button by the user on the HID. The HID scan code may be a USB scan code, a keyboard scan code, etc. As indicated in the legend, array 302 is not full. Fields 335 and 340 are free while fields 315, 320, 325, and 330 have HID scan codes. Although the array used in the examples is limited to eight bytes, array 302 may have more or less than eight bytes and thus can have more or less than six bytes for the HID scan codes.

In one embodiment, when a press key event is received, array 302 in HID descriptor buffer will be populated with an HID scan code associated with the press key event and the scan code will be kept in the HID descriptor buffer as long a release key event associated with the press key event is not received. The occupied byte in array 302 is freed when a release key event for the associated press key event is received. When the number of simultaneous key events received exceeds the size of the HID descriptor buffer or the maximum descriptor report count specified, array 302 will fail to accommodate additional key events. This may result in missing a key event by host system 120 which may lead to issues. In one scenario, if a particular key event is missed, the host system to be unresponsive or fail to stop operating such as when a key event to stop printing is missed.

FIG. 4A shows a system 400, similar to system 300, for ensuring key event delivery to a host from a virtual client during a high key event rate. That is, system 400 is configured to prevent loss of key events when an HID descriptor buffer is full. System 400 includes client 180-1, baseboard management controller 155, HID descriptor buffer 145, and host system 120. HID descriptor buffer 145 includes array 302. Baseboard management controller 155 includes remote session server 160. The components shown are not drawn to scale and system 400 may include additional or fewer components. In addition, connections between components may be omitted for descriptive clarity.

In this example, array 302 is full when HID event 410, which is similar to key event 170 of FIG. 1, is received by remote session server 160. Array 302 is full when the number of key events with pressed state exceeds the capacity of the array. As such, array 302 cannot accommodate HID event 410. Consequently, host system 120 is notified of the current state of the array by sending an error code for each one of the array fields as shown in FIG. 4B. Here the error code is set to "1." Before sending the error code to host system 120, the HID scan codes in the HID descriptor buffer may be copied and stored in another memory segment.

Figure 4C:
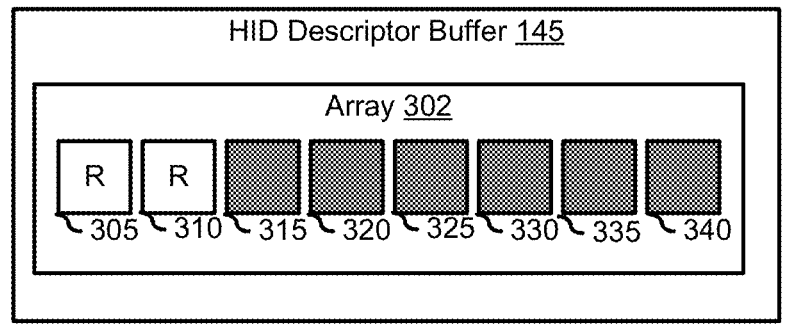
Figure 4D:
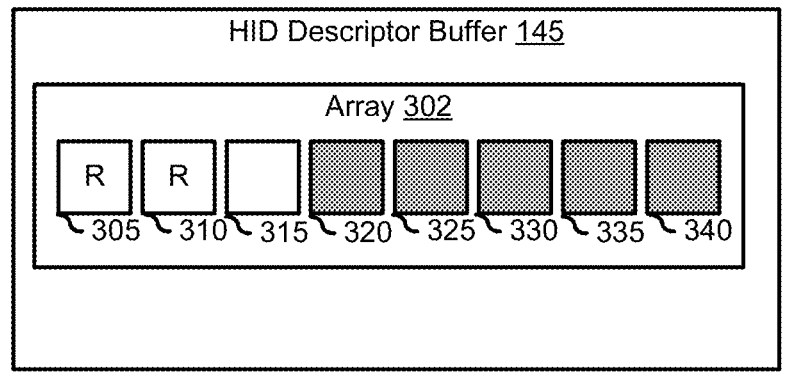

After sending the error code to host system 120, the data fields of array 302 in HID descriptor buffer 145 is cleared, as shown in FIG. 4C. The array of the HID descriptor buffer is then repopulated starting with the corresponding HID scan code of the newly received key event, HID event 410. In this example, field 315 is populated with the corresponding HID scan code of HID event 410. The remaining fields are populated with the HID scan codes that were copied and stored in the other memory segment. Once the array of the HID descriptor buffer is populated, an HID descriptor may be sent to a corresponding HID driver such as HID driver 130 which may be configured to support HIDs such as keyboards, mice, game controllers, etc. Because of the number of HID scan codes that were copied and stored, the array of the HID descriptor buffer may overflow again with the receipt of HID event 410. The above process will continue until the HID descriptor buffer does not overflow with the re-population and/or until the corresponding release key events are received which clears one or more data fields of the array in the HID descriptor buffer.

Figure 5:
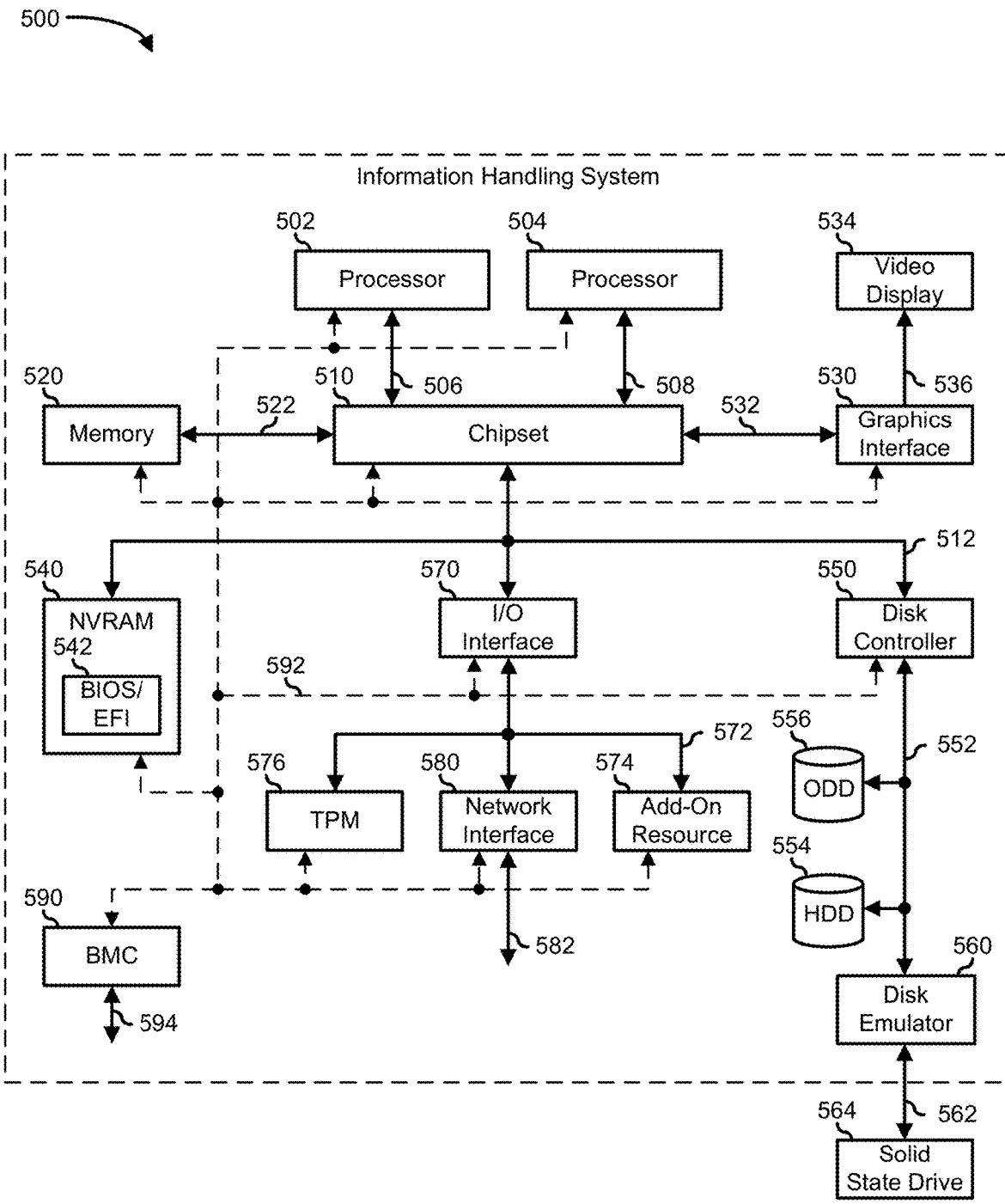
FIG. 5 is a block diagram illustrating an information handling system, according to an embodiment of the present disclosure.

FIG. 5 illustrates an embodiment of an information handling system 500 including processors 502 and 504, a chipset 510, a memory 520, a graphics adapter 530 connected to a video display 534, a non-volatile RAM (NV-RAM) 540 that includes a basic input and output system/extensible firmware interface (BIOS/EFI) module 542, a disk controller 550, a hard disk drive (HDD) 554, an optical disk drive 556, a disk emulator 560 connected to a solid-state drive (SSD) 564, an input/output (I/O) interface 570 connected to an add-on resource 574 and a trusted platform module (TPM) 576, a network interface 580, and a BMC 590. Processor 502 is connected to chipset 510 via processor interface 106, and processor 504 is connected to the chipset via processor interface 108. In a particular embodiment, processors 502 and 504 are connected together via a high-capacity coherent fabric, such as a HyperTransport link, a QuickPath Interconnect, or the like. Chipset 510 represents an integrated circuit or group of integrated circuits that manage the data flow between processors 502 and 504 and the other elements of information handling system 500. In a particular embodiment, chipset 510 represents a pair of integrated circuits, such as a northbridge component and a southbridge component. In another embodiment, some or all of the functions and features of chipset 510 are integrated with one or more of processors 502 and 504.

Memory 520 is connected to chipset 510 via a memory interface 522. An example of memory interface 522 includes a Double Data Rate (DDR) memory channel and memory 520 represents one or more DDR Dual In-Line Memory Modules (DIMMs). In a particular embodiment, memory interface 522 represents two or more DDR channels. In another embodiment, one or more of processors 502 and 504 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 520 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 530 is connected to chipset 510 via a graphics interface 532 and provides a video display output of 536 to a video display 534. An example of a graphics interface 532 includes a Peripheral Component Interconnect-Express (PCIe) interface and graphics adapter 530 can include a four-lane (×4) PCIe adapter, an eight-lane (×8) PCIe adapter, a 16-lane (×16) PCIe adapter, or another configuration, as needed or desired. In a particular embodiment, graphics adapter 530 is provided down on a system printed circuit board (PCB). Video display output 536 can include a Digital Video Interface (DVI), a High-Definition Multimedia Interface (HDMI), a DisplayPort interface, or the like, and video display 534 can include a monitor, a smart television, an embedded display such as a laptop computer display, or the like.

NV-RAM 540, disk controller 550, and I/O interface 570 are connected to chipset 510 via an I/O channel 512. An example of I/O channel 512 includes one or more point-to-point PCIe links between chipset 510 and each of NV-RAM 540, disk controller 550, and I/O interface 570. Chipset 510 can also include one or more other I/O interfaces, including a PCIe interface, an Industry Standard Architecture (ISA) interface, a Small Computer Serial Interface (SCSI) interface, an Inter-Integrated Circuit (I$^2$C) interface, a System Packet Interface (SPI), a USB, another interface, or a combination thereof. NV-RAM 540 includes BIOS/EFI module 542 that stores machine-executable code (BIOS/EFI code) that operates to detect the resources of information handling system 500, to provide drivers for the resources, to initialize the resources, and to provide common access mechanisms for the resources. The functions and features of BIOS/EFI module 542 will be further described below.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an institute of electrical and electronics engineers (IEEE) 1394 (Firewire) interface, a proprietary interface, or a combination thereof. Alternatively, SSD 564 can be disposed within information handling system 500.

I/O interface 570 includes a peripheral interface 572 that connects the I/O interface to add-on resource 574, to TPM 576, and to network interface 580. Peripheral interface 572 can be the same type of interface as I/O channel 512 or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral interface 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on a separate circuit board or add-in card disposed within information handling system 500, a device that is external to the information handling system, or a combination thereof.

Network interface 580 represents a network communication device disposed within information handling system 500, on a main circuit board of the information handling system, integrated onto another component such as chipset 510, in another suitable location, or a combination thereof. Network interface 580 includes a network channel 582 that provides an interface to devices that are external to information handling system 500. In a particular embodiment, network channel 582 is of a different type than peripheral interface 572, and network interface 580 translates information from a format suitable to the peripheral channel to a format suitable to external devices.

In a particular embodiment, network interface 580 includes a NIC or host bus adapter (HBA), and an example of network channel 582 includes an InfiniBand channel, a Fibre Channel, a Gigabit Ethernet channel, a proprietary channel architecture, or a combination thereof. In another embodiment, network interface 580 includes a wireless communication interface, and network channel 582 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 582 can be connected to an external network resource (not illustrated). The network resource can include another information handling system, a data storage system, another network, a grid management system, another suitable resource, or a combination thereof.

BMC 590 is connected to multiple elements of information handling system 500 via one or more management interface 592 to provide out-of-band monitoring, maintenance, and control of the elements of the information handling system. As such, BMC 590 represents a processing device different from processor 502 and processor 504, which provides various management functions for information handling system 500. For example, BMC 590 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 590 can vary considerably based on the type of information handling system. BMC 590 can operate in accordance with an Intelligent Platform Management Interface (IPMI). Examples of BMC 590 include an Integrated Dell® Remote Access Controller (iDRAC).

Management interface 592 represents one or more out-of-band communication interfaces between BMC 590 and the elements of information handling system 500, and can include an Inter-Integrated Circuit (I2C) bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 500, that is apart from the execution of code by processors 502 and 504 and procedures that are implemented on the information handling system in response to the executed code.

BMC 590 operates to monitor and maintain system firmware, such as code stored in BIOS/EFI module 542, option ROMs for graphics adapter 530, disk controller 550, add-on resource 574, network interface 580, or other elements of information handling system 500, as needed or desired. In particular, BMC 590 includes a network interface 594 that can be connected to a remote management system to receive firmware updates, as needed or desired. Here, BMC 590 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 590 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 590, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 590 is included on a main circuit board (such as a baseboard, a motherboard, or any combination thereof) of information handling system 500 or is integrated onto another element of the information handling system such as chipset 510, or another suitable element, as needed or desired. As such, BMC 590 can be part of an integrated circuit or a chipset within information handling system 500. An example of BMC 590 includes an iDRAC or the like. BMC 590 may operate on a separate power plane from other resources in information handling system 500. Thus BMC 590 can communicate with the management system via network interface 594 while the resources of information handling system 500 are powered off. Here, information can be sent from the management system to BMC 590 and the information can be stored in a RAM or NV-RAM associated with the BMC. Information stored in the RAM may be lost after power-down of the power plane for BMC 590, while information stored in the NV-RAM may be saved through a power-down/power-up cycle of the power plane for the BMC.

Information handling system 500 can include additional components and additional busses, not shown for clarity. For example, information handling system 500 can include multiple processor cores, audio devices, and the like. While a particular arrangement of bus technologies and interconnections is illustrated for the purpose of example, one of skill will appreciate that the techniques disclosed herein are applicable to other system architectures. Information handling system 500 can include multiple central processing units (CPUs) and redundant bus controllers. One or more components can be integrated together. Information handling system 500 can include additional buses and bus protocols, for example, I2C and the like. Additional components of information handling system 500 can include one or more storage devices that can store machine-executable code, one or more communications ports for communicating with external devices, and various input and output (I/O) devices, such as a keyboard, a mouse, and a video display.

For purpose of this disclosure, information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as processor 502, a programmable logic array (PLA), an embedded device such as a System-on-a-Chip (SoC), or other control logic hardware. Information handling system 500 can also include one or more computer-readable media for storing machine-executable code, such as software or data.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   receiving, by a baseboard management controller, a human interface device input;
   converting the human interface device input into a human interface device scan code for storage at a human interface device descriptor buffer;
   determining whether or not the human interface device descriptor buffer is full;
   copying, when the human interface device descriptor buffer is full, the human interface scan codes in the human interface device descriptor buffer to a memory segment and sending an error code to a host system;
   clearing the human interface device descriptor buffer; and
   re-populating the human interface device descriptor buffer with the human interface device scan code and the human interface device scan codes from the memory segment.

2. The method of claim 1, wherein the error code indicates that the human interface device descriptor buffer is full.

3. The method of claim 1, wherein, when the human interface device descriptor buffer is not full, the method further comprising:
   storing the human interface device scan code in the human interface device descriptor buffer.

4. The method of claim 1, wherein the human interface device input is a remote frame buffer code.

5. The method of claim 1, the method further comprises:
   storing the human interface device scan codes in an array that is included in the human interface device descriptor buffer.

6. The method of claim 1, wherein, during the re-populating of the human interface device descriptor buffer the human interface device descriptor buffer becomes full, the method further comprising:
   sending a second error code to the host system.

7. The method of claim 1, wherein the human interface device input is received from a client used to manage the host system.

8. An information handling system, comprising:
a baseboard management controller configured to:
receive human interface device input;
convert the human interface device input into a human interface device scan code for storage at a human interface device descriptor buffer;
determine whether or not the human interface device descriptor buffer is full;
copy, when the human interface device descriptor buffer is full, the human interface scan codes in the human interface device descriptor buffer to a memory segment and send an error code to a host system;
clear the human interface device descriptor buffer;
re-populate the human interface device descriptor buffer with the human interface device scan code and the human interface device scan codes from the memory segment; and
transmit a particular human interface device scan code to the host system; and
the host system configured to receive and process the particular human interface device scan code transmitted by the baseboard management controller.

9. The information handling system of claim 8, wherein the error code indicates that the human interface device descriptor buffer is full.

10. The information handling system of claim 8, wherein when the human interface device descriptor buffer is not full, the baseboard management controller is further configured to:
store the human interface device scan code in the human interface device descriptor buffer.

11. The information handling system of claim 8, wherein the human interface device input is a remote frame buffer code.

12. The information handling system of claim 8, wherein the human interface device descriptor buffer includes a human interface device descriptor which is an array of human interface device scan codes.

13. The information handling system of claim 8, wherein during the re-population, the human interface device descriptor buffer becomes full, the baseboard management controller is further configured to:
send a second error code to the host system.

14. The information handling system of claim 8, wherein the baseboard management controller is further configured to:
human interface device input is received from a client used to manage the host system.

15. A non-transitory computer-readable medium including code that when executed causes a processor to perform a method, the method comprising:
receiving human interface device input;
converting the human interface device input into a human interface device scan code for storage in a human interface device descriptor buffer;
determining whether or not the human interface device descriptor buffer is full;
copying, when the human interface device descriptor buffer is full, human interface scan codes in the human interface device descriptor buffer to a memory segment and sending an error code to a host system;
clearing the human interface device descriptor buffer; and
re-populating the human interface device descriptor buffer with the human interface device scan code and the human interface device scan codes from the memory segment.

16. The non-transitory computer-readable medium of claim 15, wherein the error code indicates that the human interface device descriptor buffer is full.

17. The non-transitory computer-readable medium of claim 15, wherein when the human interface device descriptor buffer is not full, the method further comprising:
storing the human interface device scan code in the human interface device descriptor buffer.

18. The non-transitory computer-readable medium of claim 15, wherein the human interface device input is a remote frame buffer code.

19. The non-transitory computer-readable medium of claim 15, the method further comprising:
storing the human interface device scan codes in an array included in the human interface device descriptor buffer.

20. The non-transitory computer-readable medium of claim 15, wherein during the re-populating, the human interface device descriptor buffer becomes full, the method further comprising:
sending a second error code to the host system.

* * * * *